(12) United States Patent
Kubo

(10) Patent No.: US 11,402,817 B2
(45) Date of Patent: Aug. 2, 2022

(54) LIFE PREDICTING DEVICE AND MACHINE LEARNING DEVICE

(71) Applicant: Fanuc Corporation, Yamanashi (JP)

(72) Inventor: Mamoru Kubo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 305 days.

(21) Appl. No.: 16/421,627

(22) Filed: May 24, 2019

(65) Prior Publication Data
US 2019/0369598 A1 Dec. 5, 2019

(30) Foreign Application Priority Data
May 29, 2018 (JP) .............................. JP2018-102812

(51) Int. Cl.
*G05B 19/4065* (2006.01)
*G06N 7/00* (2006.01)
*G05B 19/4062* (2006.01)
*G06N 20/00* (2019.01)

(52) U.S. Cl.
CPC ......... *G05B 19/4065* (2013.01); *G06N 7/005* (2013.01); *G05B 19/4062* (2013.01); *G05B 2219/32371* (2013.01); *G06N 20/00* (2019.01)

(58) Field of Classification Search
CPC ............ G05B 19/4062; G05B 19/4065; G05B 2219/32371; G05B 2219/37209; G06N 20/00; G06N 7/005; Y02P 90/02; G01R 31/343; B23Q 17/0995
USPC ...... 318/565; 700/108; 702/34–35, 181–183, 702/187–188; 703/2
See application file for complete search history.

(56) References Cited

U.S. PATENT DOCUMENTS

| | | | | |
|---|---|---|---|---|
| 5,822,218 A | * | 10/1998 | Moosa | G01R 31/31835 716/52 |
| 6,104,889 A | * | 8/2000 | Saitoh | G03G 15/2064 399/12 |
| 8,266,356 B2 | * | 9/2012 | Lyle | G06F 15/161 710/104 |
| 2002/0143421 A1 | * | 10/2002 | Wetzer | G06Q 10/06314 700/100 |
| 2007/0067678 A1 | * | 3/2007 | Hosek | G06F 11/008 714/25 |

(Continued)

FOREIGN PATENT DOCUMENTS

JP H11-170102 A 6/1999
JP 2002-224925 A 8/2002
(Continued)

OTHER PUBLICATIONS

Japanese Office Action for Japanese Application No. 2018-102812, dated Oct. 27, 2020, 3 pages.

(Continued)

*Primary Examiner* — Jeffrey P Aiello
(74) *Attorney, Agent, or Firm* — RatnerPrestia

(57) ABSTRACT

A machine learning device included in a life predicting device observes, as a state variable, life related data related to a life of a consumable component, creates a probability model of a service life for replacement of the consumable component on the basis of the life related data, and predicts, using the created probability model, the service life for replacement of the consumable component based on the life related data.

7 Claims, 10 Drawing Sheets

(56) References Cited

U.S. PATENT DOCUMENTS

| | | | |
|---|---|---|---|
| 2009/0096405 A1* | 4/2009 | Flickinger | G01R 31/343 318/565 |
| 2011/0172800 A1* | 7/2011 | Koizumi | G06Q 10/06 700/100 |
| 2014/0031969 A1* | 1/2014 | Baseman | G05B 19/41875 700/121 |
| 2014/0257717 A1* | 9/2014 | Kumazaki | B23Q 17/0961 702/35 |
| 2015/0160098 A1 | 6/2015 | Noda et al. | |
| 2016/0140442 A1* | 5/2016 | Lee | G06N 5/04 705/2 |
| 2017/0178015 A1 | 6/2017 | Sato et al. | |
| 2018/0181105 A1 | 6/2018 | Shindou | |
| 2019/0008461 A1* | 1/2019 | Gupta | G16H 10/40 |
| 2019/0122424 A1* | 4/2019 | Moore | G06T 7/50 |

FOREIGN PATENT DOCUMENTS

| | | | |
|---|---|---|---|
| JP | 2008210064 A | 9/2008 | |
| JP | 2009099144 A1 | 5/2009 | |
| JP | 2015088079 A | 5/2015 | |
| JP | 2016200949 A | 12/2016 | |
| JP | 2017-117013 A | 6/2017 | |
| JP | 2017102826 A | 6/2017 | |
| JP | 2018-103284 A | 7/2018 | |

OTHER PUBLICATIONS

Notice of Reasons for Refusal for Japanese Application No. 2018-102812, dated Jun. 23, 2020, with translation, 8 pages.

* cited by examiner

FIG.4

- THREE-DIMENSIONAL GRAPH DISPLAY OF MULTIDIMENSIONAL GAUSSIAN DISTRIBUTION OF COMPONENT REPLACEMENT PROBABILITY $f_{pi}(x)$

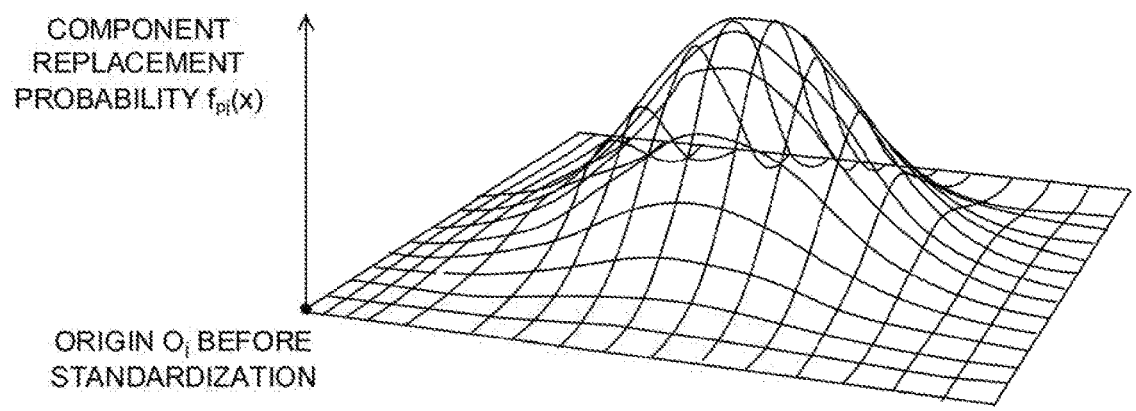

COMPONENT REPLACEMENT PROBABILITY $f_{pi}(x)$

ORIGIN $O_i$ BEFORE STANDARDIZATION

- CONTOUR LINE DISPLAY OF MULTIDIMENSIONAL GAUSSIAN DISTRIBUTION OF COMPONENT REPLACEMENT PROBABILITY $f_{pi}(x)$

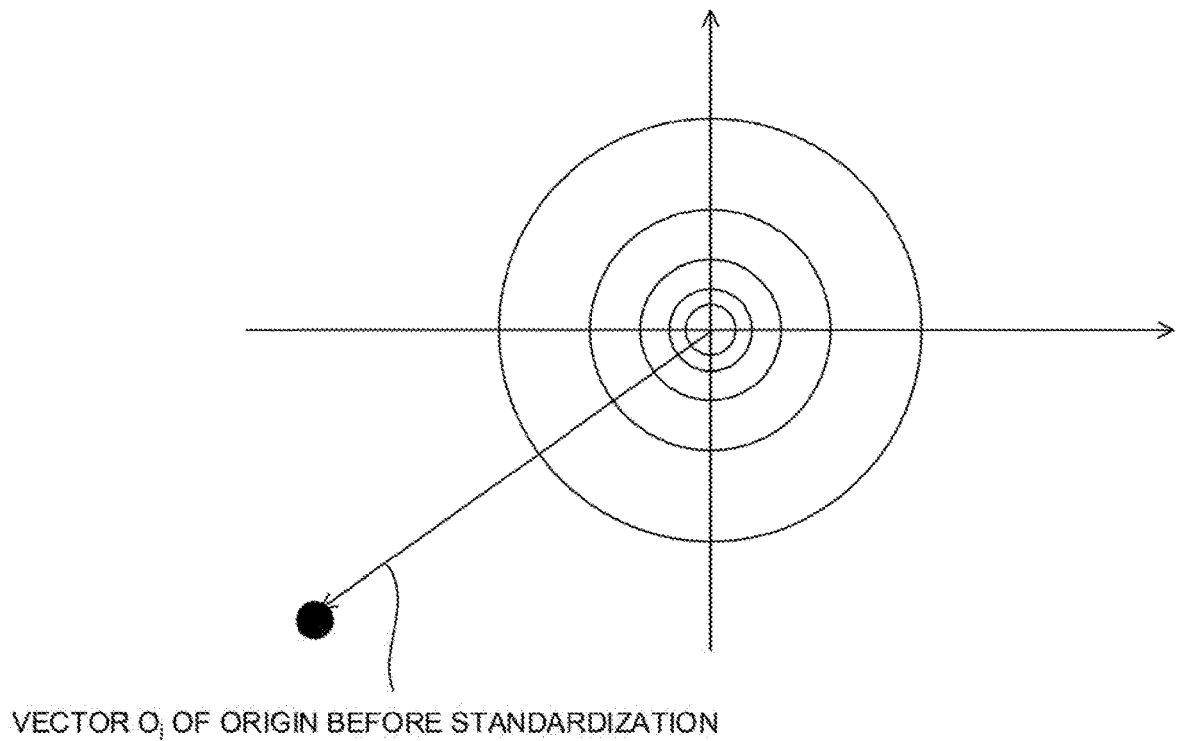

VECTOR $O_i$ OF ORIGIN BEFORE STANDARDIZATION

FIG.5
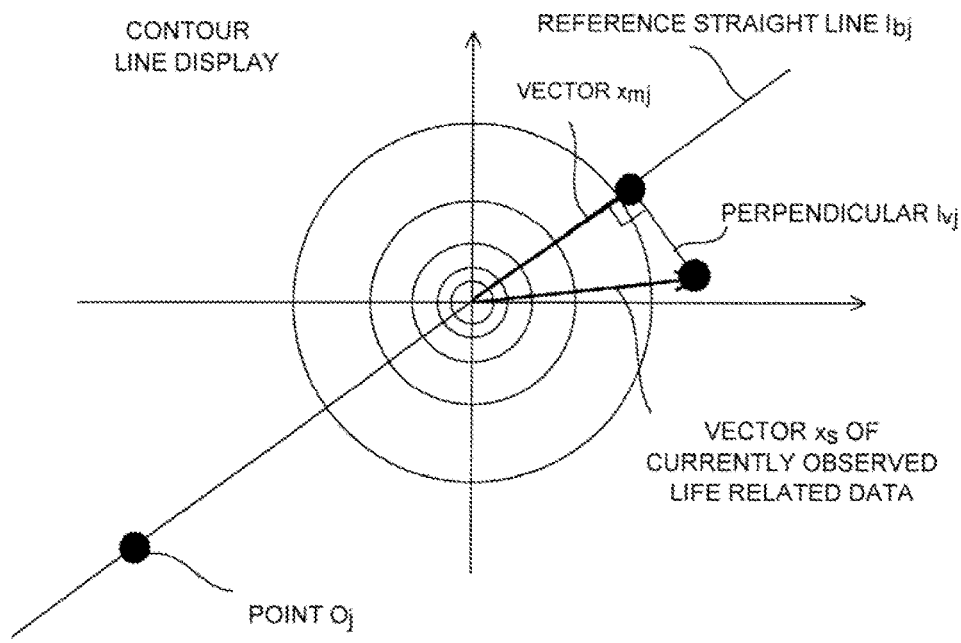
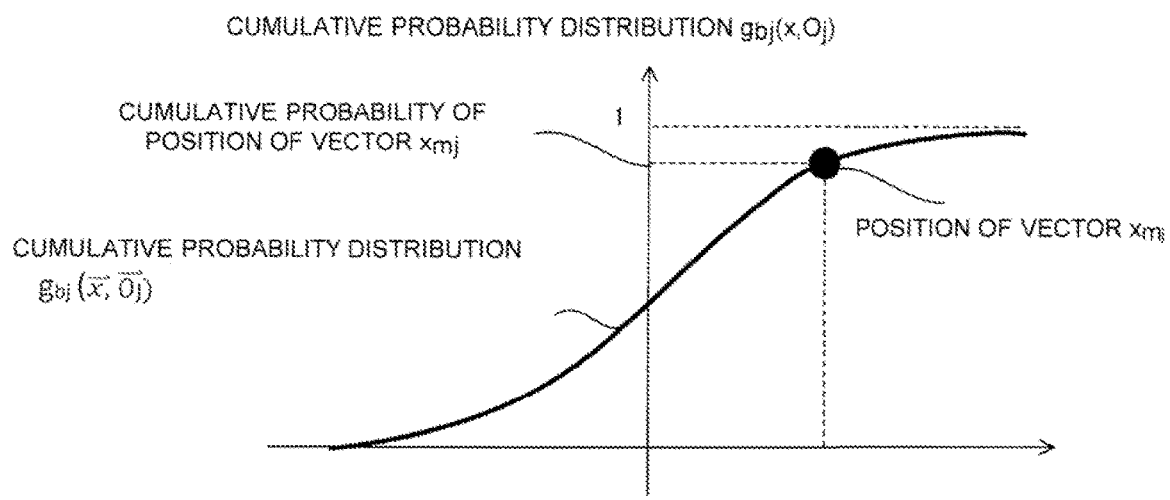

LIFE PREDICTING DEVICE AND MACHINE LEARNING DEVICE

RELATED APPLICATIONS

The present application claims priority to Japanese Patent Application Number 2018-102812 filed May 29, 2018, the disclosure of which is hereby incorporated by reference herein in its entirety.

BACKGROUND OF THE INVENTION

1. Field of the Invention

The present invention relates to a life predicting device and a machine learning device that predict a life of a consumable component of a machine tool.

2. Description of the Related Art

Among components configuring a manufacturing machine such as a machine tool or a robot, lives of consumable components that fail to perform functions and are replaced because of wear, deterioration, fatigue, and the like such as a tool, a liquid crystal panel, an insulated resistor of a motor, a bearing, a gear, a belt, and a filter fluctuate depending on conditions. Therefore, it is difficult to estimate the lives.

As a representative method for estimating a life of the tool among the consumable components of the manufacturing machine, for example, a life equation of Taylor is known (Japanese Patent Application Laid-open No. 11-170102, etc.). When a tool life is estimated using the life equation of Taylor, a constant is decided on the basis of machining conditions such as materials of the tool used for machining and workpiece and the decided constant is applied to the life equation of Taylor. Consequently, it is possible to estimate the tool life under various machining conditions. A technique for estimating a life of a tool on the basis of a machining time, the number of times of machining, and the like is also proposed (Japanese Patent Application Laid-open No 2002-224925, etc.).

In the method of estimating a life of a tool using the life equation of Taylor, the calculation of the constant based on the tool and the workpiece is necessary according to the machining conditions as explained above. The method lacks practicality because determination of a constant is complicated in a machine tool in which machining conditions frequently change. In the method of estimating a life according to a machining time and the number of times of machining, the life is estimated according to a rule of thumb based on actual machining. Therefore, a life cannot be predicted at high accuracy in a situation in which machining conditions frequently change. Therefore, in the present situation, an operator inspects a tool every time and determines a life of the tool through experience and intuition.

As an existing technique for improving accuracy of life prediction, Japanese Patent Application Laid-open No. 2018-103284 (laid open on Jul. 5, 2018) discloses a technique for collecting machining information in every unit time until an operator determines that the life of a tool is exhausted and replaces the tool, when the machine life remains, classifying the machining information through machine learning (a cluster analysis), finding whether the present machining information belongs to the cluster, and determining whether the tool life remains. By using this method, it is possible to perform highly accurate estimation of a tool life without performing complicated calculation of a life equation.

Japanese Patent Application Laid-open No. 2017-117013 discloses a technique for collecting, at any time, data indicating states of components, extracting data indicating a fixed tendency in component replacement in the past, and, when tendencies of data at the last component replacement time and present data are similar, determining that a component has reached a replacement time of the component and estimating the next replacement time by predicting a data value in future. By using this method, it is possible to estimate a component life according to a real operation state and reduce unnecessary inspections.

However, in the technique disclosed in Japanese Patent Application Laid-open No. 2018-103284, a large amount of consolidated data are necessary in order to perform the cluster analysis. Further, it is difficult to collect data of a tool having a long life. Therefore, a long time is required to start life estimation. It is only determined whether a life remains or not. Further, selection of information to be collected is necessary in advance. Therefore, researches for ascertaining data truly affecting a life are necessary.

In the technique disclosed in Japanese Patent Application Laid-open No. 2017-117013, it is necessary to collect data at any time in order to check a tendency of data indicating a state of a component. A large-capacity storage is necessary for saving of the data. As data extracted for life determination, only data indicating a fixed determined tendency can be used. The data has to be used while it is unknown whether the data truly affects a life. Further, the technique cannot be applied to data, prediction of a tendency of which is difficult, such as component replacement cost and the number of component stocks.

SUMMARY OF THE INVENTION

Therefore, an object of the present invention is to provide a life predicting device and a machine learning device capable of predicting a life of a consumable component of a manufacturing machine at predetermined accuracy even in a stage when an amount of collected data is small.

The present invention introduces a method of statistical machine learning into life prediction of a consumable component of a manufacturing machine. The life predicting device of the present invention optimizes a life probability model through machine learning from information (life related data), a relation of which with a life is estimated when a consumable component is replaced, in life prediction of consumable components (a tool, a liquid crystal panel, a motor, a bearing, a gear, a belt, a filter, etc.) of a machine tool that breaks down because of stress or fatigue. The relation with the life of the consumable component means, for example, in the case of a tool, a direct relation with the life (wear) of the consumable component such as workpiece hardness (HV), a coolant type (pH), feed rate, spindle speed, a tool edge temperature, a cutting time, a cutting distance, and cutting resistance (feed axis and spindle amplifier current values) and an economical relation with the life (wear) of the consumable component such as replacement component cost and the number of component stocks. The present invention makes it possible to perform learning with a small number of observation data using a method such as Baysian inference for observing such life related data and gradually updating parameters of a life probability model from the observed life related data.

The life predicting device of the present invention calculates, from the life probability model optimized in this way, a life probability distribution by a vector (a feature vector) including the life related data as elements and estimates, as a numerical value, a probability value of exhaustion of a life on a real-time basis from an approximate distribution by a straight line connecting an origin and an average on the calculated life probability distribution.

The life predicting device of the present invention further provides a configuration for selecting a data type (feature) truly affecting a life through machine learning (a feature selection algorithm) at a point in time when collected life related data are consolidated.

A life predicting device according to an aspect of the present invention predicts a service life for replacement of a consumable component of a manufacturing machine. The life predicting device includes a machine learning device that learns the service life for replacement of the consumable component. The machine learning device includes: a state observing section that observes, as a state variable, life related data set as an observation target among life related data related to a life of the consumable component; a state-variable storing section that stores the life related data observed as the state variable by the state observing section; and a life-probability predicting section that creates a probability model of the service life for replacement of the consumable component on the basis of the life related data observed as the state variable by the state observing section and predicts, using the created probability model, the service life for replacement of the consumable component based on the life related data observed as the state variable by the state observing section.

The life-probability predicting section may include a probability-model optimizing section that updates and optimizes parameters of the probability model on the basis of the life related data observed as the state variable by the state observing section.

The life-probability predicting section may include a cumulative-distribution calculating section that creates, on the basis of the life related data observed as the state variable by the state observing section, a cumulative probability distribution of the service life for replacement obtained by accumulating replacement probability density of the consumable component on the basis of the probability model and predicts the service life for replacement of the consumable component using the created cumulative probability distribution.

The machine learning device may further include a feature selecting section that selects life related data as an observation target of the state observing section. The feature selecting section may include: a cross validation section that calculates, through cross validation, generalization performance of the probability model of the service life for replacement of the consumable component created on the basis of the life related data; and a feature reducing section that specifies, on the basis of the generalization performance of the probability model calculated by the cross validation section, a type of life related data having a low relation with a life of the consumable component among the life related data stored in the state-variable storing section and reduces, from the life related data as the observation target of the state observing section, the specified type of the life related data having the low relation with the life of the consumable component.

A machine learning device according to an embodiment of the present invention learns a service life for replacement of a consumable component of a manufacturing machine. The machine learning device includes: a state observing section that that observes, as a state variable, life related data set as an observation target among life related data related to a life of the consumable component; a state-variable storing section that stores the life related data observed as the state variable by the state observing section; and a life-probability predicting section that creates a probability model of the service life for replacement of the consumable component on the basis of the life related data observed as the state variable by the state observing section and predicts, using the created probability model, the service life for replacement of the consumable component based on the life related data observed as the state variable by the state observing section.

The life-probability predicting section may include a probability-model optimizing section that updates and optimizes parameters of the probability model on the basis of the life related data observed as the state variable by the state observing section.

The life-probability predicting section may include a cumulative-distribution calculating section that creates, on the basis of the life related data observed as the state variable by the state observing section, a cumulative probability distribution of the service life for replacement obtained by accumulating replacement probability density of the consumable component on the basis of the probability model and predicts the service life for replacement of the consumable component using the created cumulative probability distribution.

The machine learning device may further include a feature selecting section that selects life related data as an observation target of the state observing section. The feature selecting section may include: a cross validation section that calculates, through cross validation, generalization performance of the probability model of the service life for replacement of the consumable component created on the basis of the life related data; and a feature reducing section that specifies, on the basis of the generalization performance of the probability model calculated by the cross validation section, a type of life related data having a low relation with a life of the consumable component among the life related data stored in the state-variable storing section and reduces, from the life related data as the observation target of the state observing section, the specified type of the life related data having the low relation with the life of the consumable component.

According to the present invention, a probability of exhaustion of the present life is known as a numerical value on a real-time basis. Therefore, an unaccustomed operator can grasp a guide for component replacement without confirming a state of a component every time. A skilled operator can prevent a prediction mistake and oblivion of component replacement.

According to the present invention, a data type truly affecting a life is extracted by machine learning. Therefore, all data likely to be related to a life only have to be selected at first in expectation of a result of the machine learning. Therefore, it is possible to reduce cost for selection of data during initial introduction compared with the existing technique.

BRIEF DESCRIPTION OF THE DRAWINGS

FIG. 4 is a diagram showing an example in which life related data and a replacement probability of a consumable component are modeled using a multidimensional probability density function;

FIG. 5 is a diagram for explaining a method of calculating a replacement probability of a consumable component using the multidimensional probability density function;

DETAILED DESCRIPTION OF THE PREFERRED EMBODIMENTS

Figure 1:
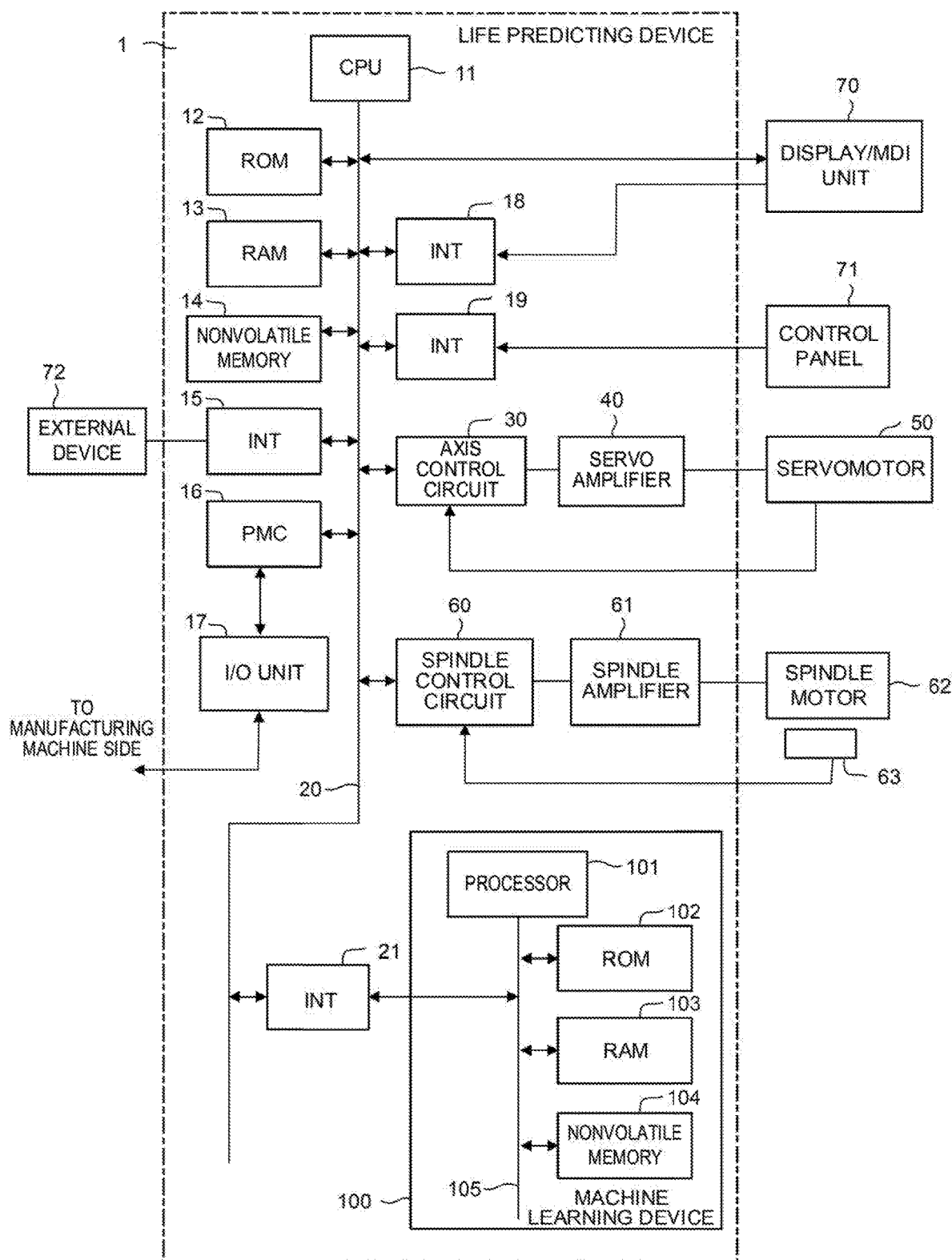
FIG. 1 is a schematic hardware configuration diagram of a life predicting device according to a first embodiment.

FIG. 1 is a schematic hardware configuration diagram showing a main part of a life predicting device according to an embodiment of the present invention.

A life predicting device 1 can be implemented as a controller that controls a manufacturing machine such as a robot or a machine tool or can be implemented as a computer such as a personal computer juxtaposed with the controller that controls the manufacturing machine, a cell computer connected to the controller via a network, a host computer, or a cloud server. FIG. 1 shows an example in which the life predicting device 1 is implemented as the controller that controls the manufacturing machine.

A CPU 11 included in the life predicting device 1 according to this embodiment is a processor that controls the life predicting device 1 as a whole. The CPU 11 reads out, via a bus 20, a system program stored in a ROM 12 and controls the entire life predicting device 1 according to the system program. Temporary calculation data and display data, various data input by an operator via an input section, and the like are temporarily stored in a RAM 13.

A nonvolatile memory 14 is configured as a memory that retains a storage state by, for example, being backed up by a battery (not shown) even if a power supply of the life predicting device 1 is turned off. In the nonvolatile memory 14, a program for control read from an external device 72 via an interface 15, a program for control input via a display/MDI unit 70, and various data (e.g., workpiece hardness, a coolant type, feed rate, spindle speed, a tool edge temperature, a cutting time, a cutting distance, and cutting resistance (feed axis and spindle amplifier current values), replacement component cost, the number of component stocks, and the like) acquired from the sections of the life predicting device 1 and a manufacturing machine 2 (see FIG. 2) are stored. The program for control and the various data stored in the nonvolatile memory 14 may be developed in the RAM 13 during execution and during use. In the ROM 12, various system programs such as a publicly-known analysis program (including a system program for controlling input from and output to a machine learning device 100 explained below) are written in advance.

The interface 15 is an interface for connecting the life predicting device 1 and the external device 72 such as a USB device. A program for control, various parameters, and the like are read from the external device 72 side. The program for control, the various parameters, and the like edited in the life predicting device 1 can be stored in external storing means (not shown) via the external device 72. A programmable machine controller (PMC) 16 outputs signals to a machine tool (not shown) and a peripheral device (e.g., an actuator such as a robot hand for tool replacement) of the machine tool via an I/O unit 17 and controls the machine tool and the peripheral device according to a sequence program incorporated in the life predicting device 1. The programmable machine controller 16 receives signals of various switches and the like of a control panel disposed in a main body of the machine tool, performs necessary signal processing on the signals, and thereafter passes the signals to the CPU 11.

The display/MDI unit 70 is a manual data input device including a display and a keyboard. An interface 18 receives a command and data from a keyboard of the display/MDI unit 70 and passes the command and the data to the CPU 11. An interface 19 is connected to a control panel 71 including a manual pulse generator used in manually driving axes.

An axis control circuit 30 for controlling axes included in the manufacturing machine receives a movement command amount of the axes from the CPU 11 and outputs a command for the axes to a servo amplifier 40. The servo amplifier 40 receives the command and drives a servomotor 50 that moves the axes included in the machine tool. The servomotor 50 for the axes incorporates a position and speed detector, feeds back a position and speed feedback signal from the position and speed detector to the axis control circuit 30, and performs feedback control of a position and speed. In the hardware configuration diagram of FIG. 1, only one axis control circuit 30, one servo amplifier 40, and one servomotor 50 are shown. However, actually, the axis control circuit 30, the servo amplifier 40, and the servomotor 50 are prepared by the number of axes included in a manufacturing machine set as a control target.

A spindle control circuit 60 receives a spindle rotation command to the manufacturing machine and outputs a spindle speed signal to a spindle amplifier 61. The spindle amplifier 61 receives the spindle speed signal, rotates a spindle motor 62 of the manufacturing machine at designated rotating speed, and drives a tool. A position coder 63 is coupled to the spindle motor 62. The position coder 63 outputs a feedback pulse in synchronization with rotation of a spindle. The feedback pulse is read by the CPU 11.

An interface 21 is an interface for connecting the life predicting device 1 and the machine learning device 100. The machine learning device 100 is configured by connecting, via a bus 105, a processor 101 that controls the entire machine learning device 100, a ROM 102 having stored therein a system program and the like, a RAM 103 for performing temporary storage in various kinds of processing related to machine learning, and a nonvolatile memory 104 used for storage of a learning model and the like. The machine learning device 100 can observe various kinds of information (e.g., machining conditions (a workpiece material, a machining type, a notching amount, a cutting amount, etc.) input by the operator, tool information, cutting conditions (spindle speed and feed rate), and an operation state (a spindle load during machining, etc.)) that can be acquired by the life predicting device 1 via the interface 21. The life predicting device 1 displays, on the display/MDI unit 70, prediction of a life of a consumable component included in the manufacturing machine output from the machine learning device 100.

Figure 2:
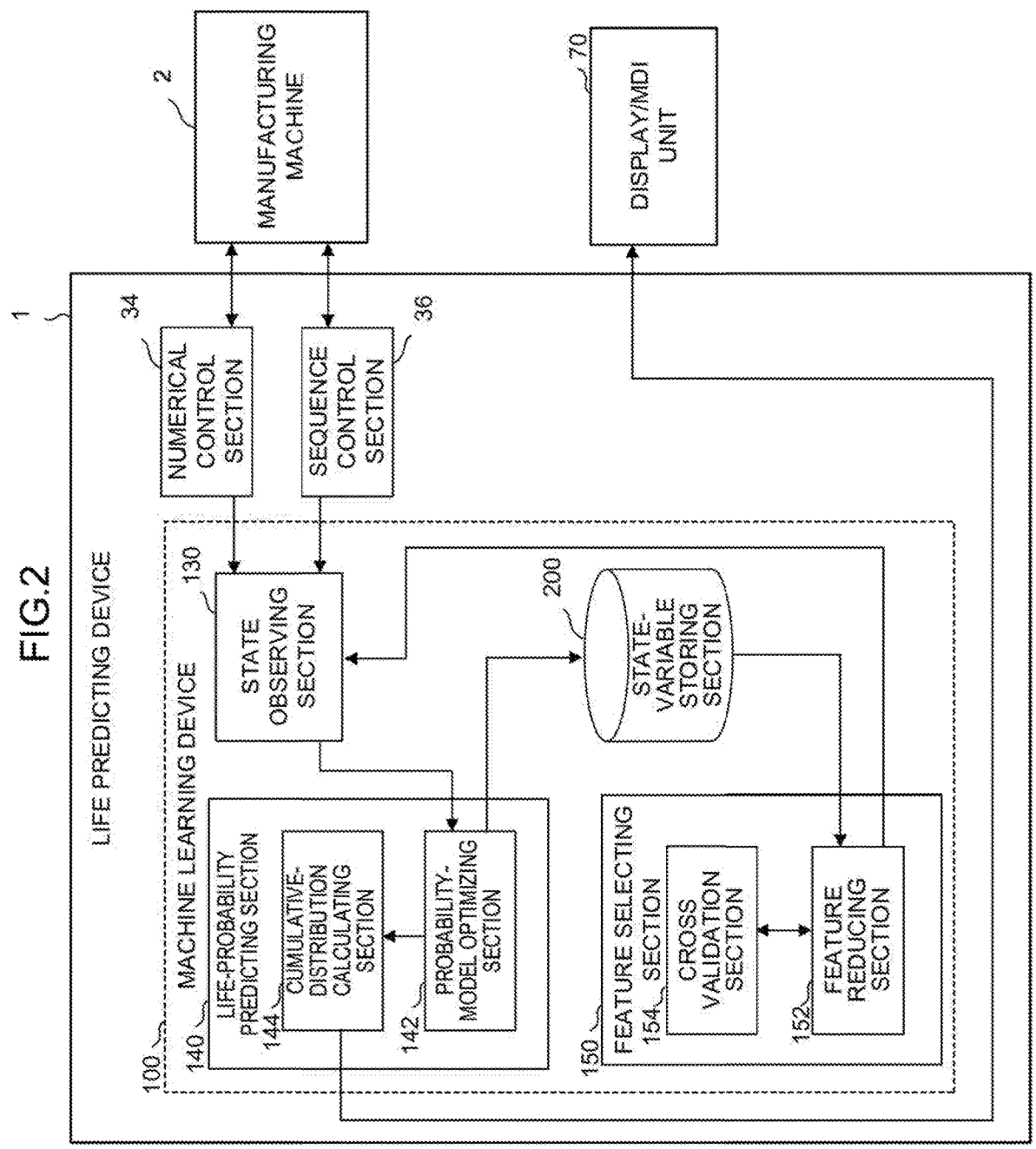
FIG. 2 is a schematic functional block diagram of the life predicting device shown in FIG. 1.

FIG. 2 is a schematic functional block diagram of the life predicting device 1 and the machine learning device 100 according to the first embodiment.

Functional blocks shown in FIG. 2 are implemented by the CPU 11 included in the life predicting device 1 and the processor 101 of the machine learning device 100 shown in FIG. 1 executing the system programs of the CPU 11 and the processor 101 and controlling operations of the sections of the life predicting device 1 and the machine learning device 100.

The life predicting device 1 according to this embodiment includes a numerical control section 34 that controls motors such as the servomotor 50 and the spindle motor 62 included in the manufacturing machine 2 on the basis of setting of a program for control (a program for numerical control), machining conditions, cutting conditions, and the like stored in the nonvolatile memory 14 and detects states of the motors and a sequence control section 36 that controls a peripheral device (not shown) of the manufacturing machine 2 on the basis of a sequence program and detects a signal from the peripheral device. The machining conditions, the cutting conditions, and the like used for the control by the numerical control section 34, the states of the motors included in the manufacturing machine 2 acquired by the numerical control section 34, and the signals detected from the manufacturing machine 2 and the peripheral device acquired by the sequence control section 36 are output to the machine learning device 100.

On the other hand, the machine learning device 100 included in the life predicting device 1 includes a state observing section 130 that observes, as state variables indicating an operation state of the manufacturing machine 2, data output from the numerical control section 34 and the sequence control section 36, a life-probability predicting section 140 that predicts a life probability of a consumable component of the manufacturing machine 2 on the basis of the state variables observed by the state observing section 130, and a feature selecting section 150 that analyzes a probability model constructed by the life-probability predicting section 140 and selects a state variable particularly related to the life of the consumable of the manufacturing machine 2 as data indicating features of the life of the consumable component. A state-variable storing section 200 that stores the state variables observed by the state observing section 130 is secured on the nonvolatile memory 104 (FIG. 1).

The state observing section 130 observes, as a state variable indicating an operation state of the manufacturing machine 2, data (life related data) set as an observation target among the data output from the numerical control section 34 and the sequence control section 36. Life related data that should be set as an observation target for the state observing section 130 is different depending on a consumable component set as a prediction target of a service life for replacement. For example, if a service life for replacement of a tool used for machining in a machining center functioning as the manufacturing machine 2 is predicted, it is desirable to set hardness of a workpiece, a cutting time, feed rate, spindle speed, and the like as the observation target. On the other hand, if a service life for replacement of an ion exchange filter used in an electric discharge machine functioning as the manufacturing machine 2 is predicted, it is desirable to set a type of machining fluid, a filtering time, and the like as the observation target. However, in the life predicting device 1 of the present invention, appropriate life related data is selected as the observation target by the feature selecting section 150 as operation is continued. Therefore, all observable life related data are desirably set as the observation target in an initial stage. That is, in an initial period, the state observing section 130 observes, as a state variable, life related data designated as the observation target by the operator. After selection of life related data indicating a feature of the life of the consumable component is performed by the feature selecting section 150, the state observing section 130 observes, as a state variable, the life related data selected by the feature selecting section 150.

Figure 3:
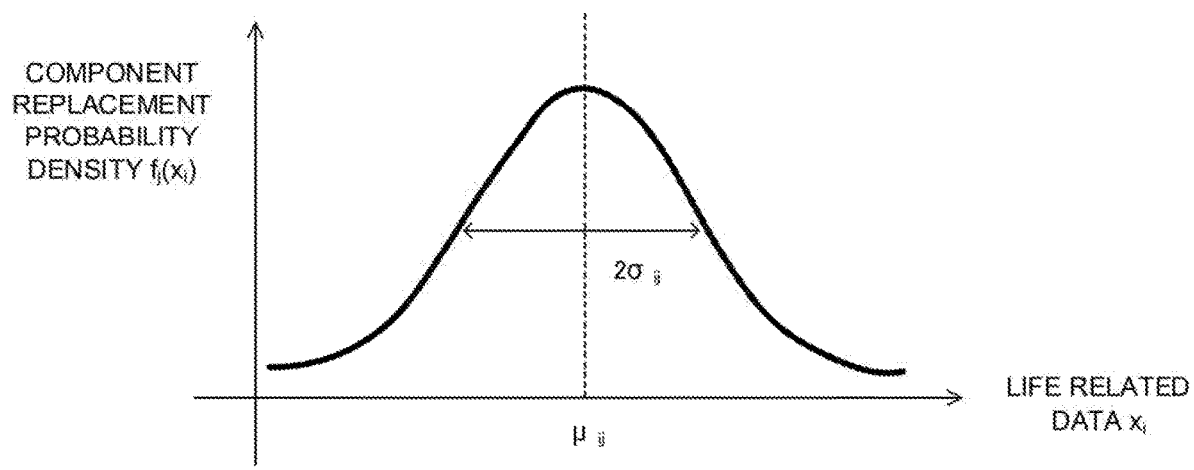
FIG. 3 is a diagram showing an example in which life related data and a replacement probability of a consumable component are modeled using a probability density function.

The life-probability predicting section 140 constructs and updates a probability model for each consumable component of the manufacturing machine 2 on the basis of the life related data observed as the state variable by the state observing section 130 and predicts a life of the consumable using the constructed probability model. In the present invention, a central limit theorem (all probability distributions converge in a Gaussian distribution) is generally used and the Gaussian distribution is generally used as a life distribution of a component that breaks down because of stress and fatigue. Therefore, assuming that a relation between each of the life related data observed by the state observing section 130 and a replacement probability of the consumable component of the manufacturing machine 2 conforms to the Gaussian distribution, a relation between life related data $x_i$ (i=1, 2, . . . , n; n is the number of life related data) and a probability density function $f_j(x_i)$ (j=1, 2, . . . , m; m is the number of consumable components) indicating the replacement probability of the consumable component is modeled using, for example, a component replacement probability density function illustrated by Expression (1) described below (FIG. 3). In Expression (1), $x_i$ is life related data, $\mu_{ij}$ is an average of the life related data $x_i$ during component replacement of a j-th consumable component, and $\sigma_{ij}^2$ is dispersion of the life related data $x_i$ during the component replacement of the j-th consumable component. When the component replacement probability density function shown in Expression (1) is used as a probability model, based on the premise that there is a positive correlation (direct proportion) between the respective life related data and the replacement probability of the consumable component, concerning life related data having a negative correlation with the replacement probability of the consumable component, preprocessing (e.g., calculating an inverse) is performed on the life related data in advance to convert the life related data to have a positive correlation with the replacement probability of the consumable component.

$$f_j(x_i) = \frac{1}{\sqrt{2\pi\sigma_{ij}^2}} \exp\left(-\frac{(x_i - \mu_{ij})^2}{2\sigma_{ij}^2}\right) \quad (1)$$

When constructing a probability model first, the life-probability predicting section 140 uses values set as initial values concerning the average $\mu_{ij}$ and the dispersion $\sigma_{ij}^2$, which are parameters of the probability density function $f_j(x_i)$ shown in Expression (1). While the manufacturing machine 2 is operated later, the life-probability predicting section 140 updates these parameters on the basis of a state variable observed by the state observing section 130 to optimize a probability model of a replacement probability of the consumable component of the manufacturing machine 2. For example, the initial values of the average $\mu_{ij}$ and the dispersion $\sigma_{ij}^2$, which are the parameters of the function $f_j(x_i)$ shown in Expression (1), only have to be input from the display/MDI unit 70 by the operator. Alternatively, for example, learned parameters of another device only have to be transferred and used as the initial values. By first giving parameters of the probability density function $f_j(x_i)$ that are likely to a certain degree, it is possible to predict a service life for replacement of the consumable component of the manufacturing machine 2 at predetermined accuracy from a stage when life related data is not collected.

A probability-model optimizing section 142, which is functional means for playing a role of optimization of a probability model, updates the parameters of the probability density function $f_j(x_i)$ using Expression (2) and Expression (3) described below on the basis of the life related data $x_i$ observed by the state observing section 130 immediately before the consumable component of the manufacturing machine 2 is replaced. In Expression (2) and Expression (3), $x_i$ is life related data, N is a cumulative total number of observation data (>0), $\mu_{ij0}$ and $\sigma_{ij0}$ are initial values of the parameters, $\mu_{ij}$ and $\sigma_{ij}$ are the parameters before the update, and $\mu_{ijN}$ and $\sigma_{ijN}$ are the parameters after the update. The life related data $x_i$ observed by the state observing section 130 and used for the optimization of the probability model is stored in the state-variable storing section 200.

$$\mu_{ij_N} = \frac{\sigma_{ij}^2}{N\sigma_{ij_0}^2 + \sigma_{ij}^2}\mu_{ij_0} + \frac{N\sigma_{ij_0}^2}{N\sigma_{ij_0}^2 + \sigma_{ij}^2}\frac{(N-1)\mu_{ij} + x_i}{N} \quad (2)$$

$$\frac{1}{\sigma_{ij_N}^2} = \frac{1}{\sigma_{ij_0}^2} + \frac{N}{\sigma_{ij}^2} \quad (3)$$

The life-probability predicting section 140 predicts a replacement probability of the consumable component of the manufacturing machine 2 on a real-time basis on the basis of the replacement probability density function $f_j(x_i)$ of the consumable component of the manufacturing machine 2 modeled in this way. More specifically, a cumulative-distribution calculating section 144 included in the life-probability predicting section 140 standardizes respective replacement probability density functions $f_j(x_i)$ such that an average and dispersion of the life related data $x_i$ are 0 and 1, then, creates a probability density function $f_{pj}(x)$ of a multidimensional Gaussian distribution including, as elements, the life related data $x_i$ shown in Expression (4) described below, and predicts a replacement probability of the consumable component of the manufacturing machine 2 on a real-time basis using the multidimensional Gaussian distribution. In Expression (4), a vector x is a vector (a feature vector) including the life related data $x_i$ as elements, D is a dimension number of the vector x, and T is a sign indicating a transposed matrix.

$$f_{pj}(\vec{x}) = \frac{1}{(2\pi)^{D/2}}\exp\left(-\frac{1}{2}\vec{x}^T\vec{x}\right) \quad (4)$$

FIG. 4 illustrates, as a graph, a multidimensional Gaussian distribution created by the cumulative-distribution calculating section 144.

In FIG. 4, to simplify explanation, an example of a multidimensional Gaussian distribution created using two life related data is shown. However, FIG. 4 is a multidimensional graph formed using a larger number of life related data. The cumulative-distribution calculating section 144 calculates a point $O_j$ mapped to a region in which an origin before standardization, which is the origin of the vector x before the standardization is performed, is standardized in the multidimensional Gaussian distribution of the replacement probability of the consumable created as explained above.

Subsequently, shown in FIG. 5, is a contour line display of the multidimensional Gaussian distribution of component replacement probability $f_{pj}(x)$ and the cumulative probability distribution $g_{bj}(\vec{x}, \vec{O_j})$ of service life for replacement of the consumable component on reference straight line $l_{bj}$. The cumulative-distribution calculating section 144 calculates a reference straight line $l_{bj}$ connecting the position $O_j$ of the origin mapped to the region before standardization and the center of the multidimensional Gaussian distribution (i.e., an extended line of the vector $O_j$ in both forward and backward directions) and further calculates a vector $x_{mj}$ of a crossing position of a perpendicular $l_{vj}$, which is drawn down from a point $x_s$ of life related data currently observed by the state observing section 130 to the reference straight line $l_{bj}$, and the reference straight line $l_{bj}$ (i.e., calculates the vector $x_{mj}$ where an inner product of the vector $O_j$ and (vector $x_s$-vector $x_{mj}$) is 0). The cumulative-distribution calculating section 144 calculates a cumulative probability distribution $g_{bj}(x, O_j)$ from point $O_j$ along reference straight line $l_{bj}$ of a service life for replacement of the consumable component of service life for replacement of the consumable component, which is indicated by Expression (5) described below, obtained by accumulating replacement probability density of the consumable component of the manufacturing machine 2 from the position $O_j$ of the origin before standardization along the reference straight line $l_{bj}$ and calculates a replacement probability of the consumable component of the manufacturing machine 2 in the position of the vector $x_{mj}$ using the calculated cumulative probability distribution $g_{bj}(x, O_j)$ of the service life for replacement of the consumable component. For example, the replacement probability of the consumable component of the manufacturing machine 2 calculated by the cumulative-distribution calculating section 144 may be output to the display/MDI unit 70 or may be transmitted to a computer such as a cell computer, a host computer, or a cloud server via a network (not shown in the figures) and used.

$$g_{bj}(\vec{x}, \vec{O_j}) = \frac{1}{2}\left(1 + \mathrm{erf}\left(\frac{|\vec{x} - \vec{O_j}| - |\vec{O_j}|}{\sqrt{2}}\right)\right) \quad (5)$$

The feature selecting section 150 analyzes the probability model constructed by the life-probability predicting section 140 and selects, as data indicating a feature of the life of the consumable component of the manufacturing machine 2, a state variable particularly related to the life of the consumable component. The feature selecting section 150 executes feature selection on the basis of the life related data stored in the state-variable storing section 200 and performs reduction of types (features) of the life related data. In the following explanation, an example of feature selection performed using a publicly-known greedy search algorithm is explained. However, any method may be used if selection of features can be performed by the method. For example, a genetic algorithm can also be used.

A feature reducing section 152, which is functional means included in the feature selecting section 150, temporarily excludes, for each of types (a workpiece material, feed rate, etc.) of the respective life related data stored in the state-variable storing section 200, the type of the life related data, then instructs a cross validation section 154 to perform publicly-known cross validation on the life related data, the data type of which is excluded, and evaluates generalization performance of a probability model of the life related data.

Figure 6:
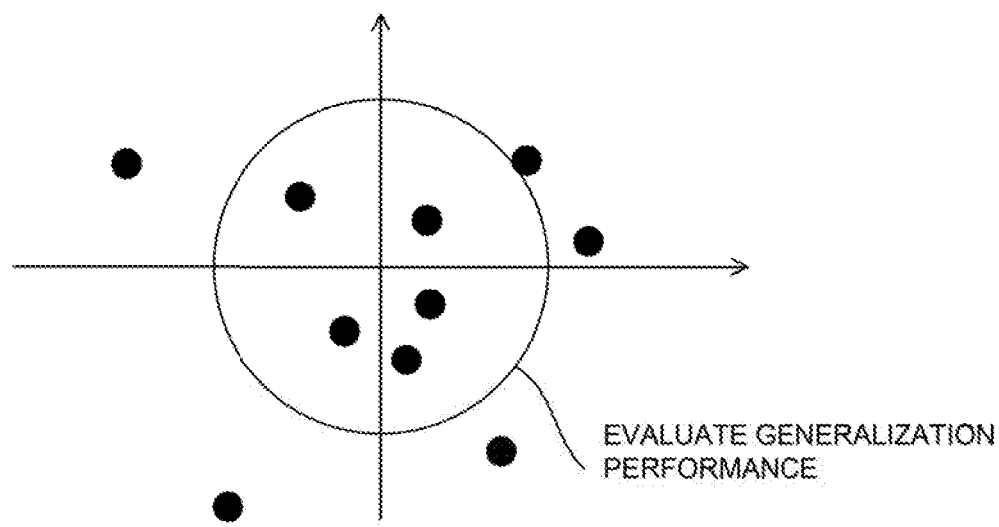
FIG. 6 is a diagram for explaining an example of a calculation method for generalization performance by cross validation.

For example, when a set of a group ($x_1, x_2, \ldots, x_{(k-1)}, x_{(x+1)}, \ldots,$ and $x_n$) of life related data types in which a type of k-th life related data is excluded is given, the cross validation section 154 divides the set of the group of the life related data into two groups at random, sets one group as training data and sets the other as test data, creates a probability model optimized on the basis of the training data, and then calculates, as a value indicating generalization performance, an applicable degree of the test data to the probability model. For the calculation of the applicable degree, for example, as illustrated in FIG. 6, evaluation may be performed using a simple standard, that is, for example, how many test data are present within a predetermined distance from the center of the probability model created using the training data with a number of test data present within a distance of a specified value from center of the optimized constructed model created on the basis of training data. The cross validation section 154 repeats, for the given set of the group of the life related data, a predetermined times (the number of times of validation), the division into the training data and the test data and the calculation of the generalization performance performed using the divided training data and test data and outputs, as a final generalization performance value concerning the life related data in which the type of the life related data is excluded, an average or an integrated value of a plurality of calculated values of generalization performance calculated as a result of repeating the division and the calculation.

The feature reducing section 152 selects a group of life related data type at the time when a highest generalization performance value is calculated among a plurality of generalization performance values including a generalization performance value of the life related data in the case of exclusion of a first life related data type, a generalization performance value of the life related data in the case of exclusion of a second life related data type, . . . , and a generalization performance value of the life related data in the case of exclusion of an n-th life related data type. The feature reducing section 152 considers that the life related data types excluded in the selection have a low relation with the life of the consumable component of the manufacturing machine 2 and removes the life related data types from state variables observed by the state observing section 130. The feature reducing section 152 further excludes, for the remaining types of the life related data set as the observation target, for each of the types of the respective life related data, the type of the life related data, then instructs the cross validation section 154 to perform the cross validation, and evaluates generalization performance of a probability model.

Figure 7:
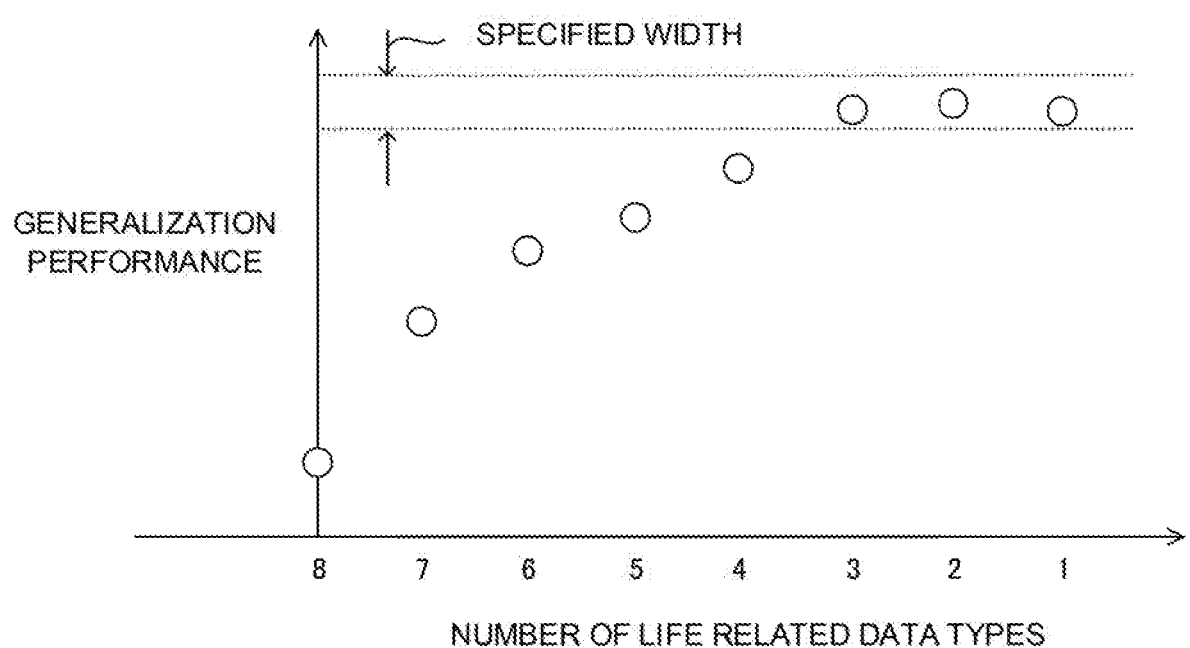
FIG. 7 is a diagram for explaining an example of a convergence condition in feature reduction processing.

The feature reducing section 152 repeats such processing and, as shown in FIG. 7, when a maximum difference in generalization performance of probability models before and after the reduction is equal to or smaller than a predetermined specified width, determines that the generalization performance converges, and ends the processing of the feature selection. The feature selecting section 150 sets only a finally remaining type of the life related data as a target of subsequent state observation by the state observing section 130 and uses the type of the life related data for estimation of a service life for replacement of the consumable component of the manufacturing machine 2.

Figure 8:
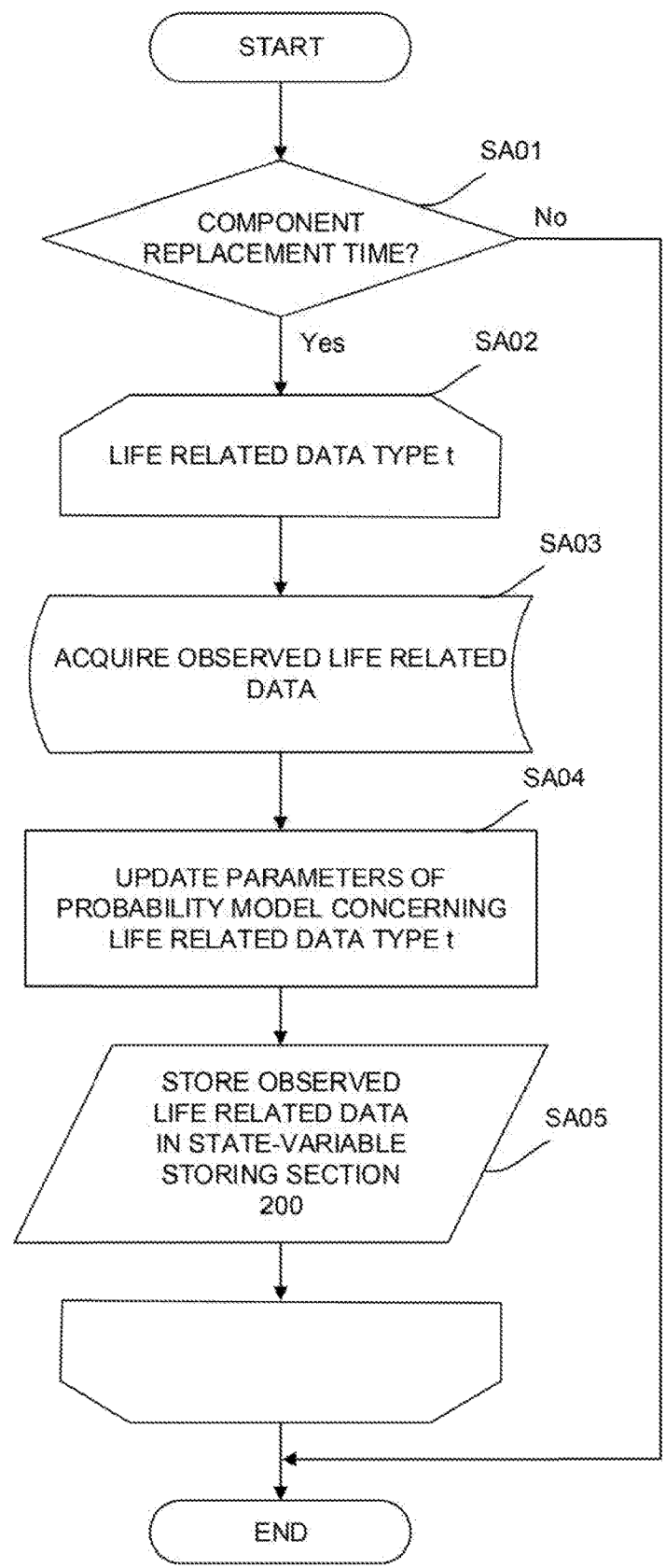
FIG. 8 is a schematic flowchart of processing executed by a probability-model optimizing section in the life predicting device shown in FIG. 1.

FIG. 8 is a schematic flowchart of processing executed by the probability-model optimizing section 142. The processing shown in the flowchart of FIG. 8 is executed at every predetermined cycle (e.g., every control cycle of the life predicting device 1).

[Step SA01] The probability-model optimizing section 142 determines whether replacement of a consumable component of the manufacturing machine 2 is performed. When the replacement of the consumable component is performed, the probability-model optimizing section 142 shifts the processing to step SA02. When the replacement of the consumable component is not performed, the probability-model optimizing section 142 ends the processing at the present cycle.

[Step SA02] The probability-model optimizing section 142 repeatedly executes steps SA03 to SA05 for each type of life related data observed by the state observing section 130.

[Step SA03] The probability-model optimizing section 142 acquires life related data observed immediately before step SA03 by the state observing section 130.

[Step SA04] The probability-model optimizing section 142 updates, using the life related data acquired in step SA03, parameters of a probability model concerning the consumable component set as a replacement target.

[Step SA05] The probability-model optimizing section 142 stores the life related data acquired in step SA03 in the state-variable storing section 200.

Figure 9:
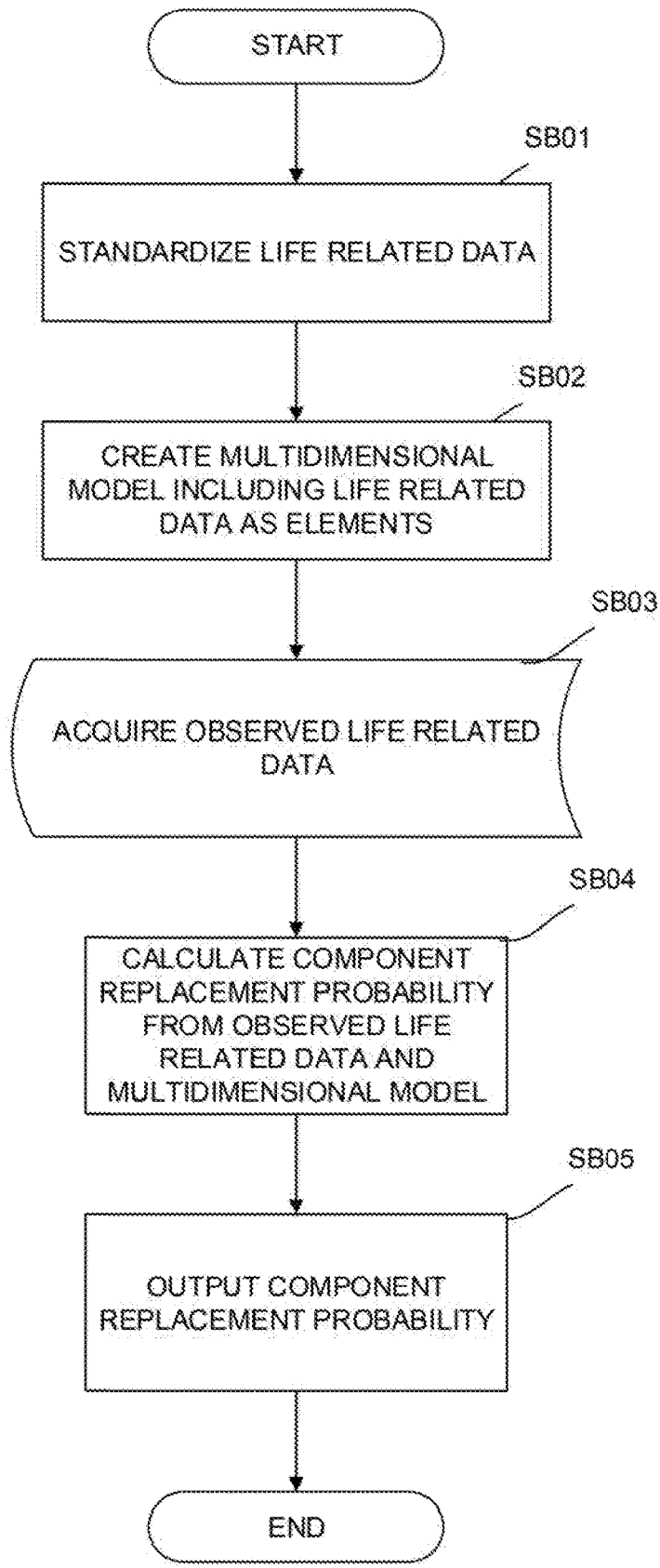
FIG. 9 is a schematic flowchart of processing executed by a cumulative-distribution calculating section in the life predicting device shown in FIG. 1.

FIG. 9 is a schematic flowchart of processing executed by the cumulative-distribution calculating section 144. The processing shown in the flowchart of FIG. 9 is executed at every predetermined cycle (e.g., every control cycle of the life predicting device 1).

[Step SB01] The cumulative-distribution calculating section 144 standardizes respective life related data such that an average and dispersion of the life related data are 0 and 1.

[Step SB02] The cumulative-distribution calculating section 144 creates the probability density function $f_{pj}(x)$ of a multidimensional Gaussian distribution including the life related data $x_i$ as elements.

[Step SB03] The cumulative-distribution calculating section 144 acquires life related data observed by the state observing section 130.

[Step SB04] The cumulative-distribution calculating section 144 creates a cumulative probability distribution of a service life for replacement of a consumable component on the basis of the probability density function $f_{pj}(x)$ of the multidimensional Gaussian distribution created in step SB02 and calculates, using the created cumulative probability distribution, a probability of the service life for replacement of the consumable component of the manufacturing machine 2 based on the life related data acquired in step SB03.

[Step SB05] The cumulative-distribution calculating section 144 outputs the probability of the service life for replacement of the consumable component of the manufacturing machine 2 calculated in step SB04.

Figure 10:
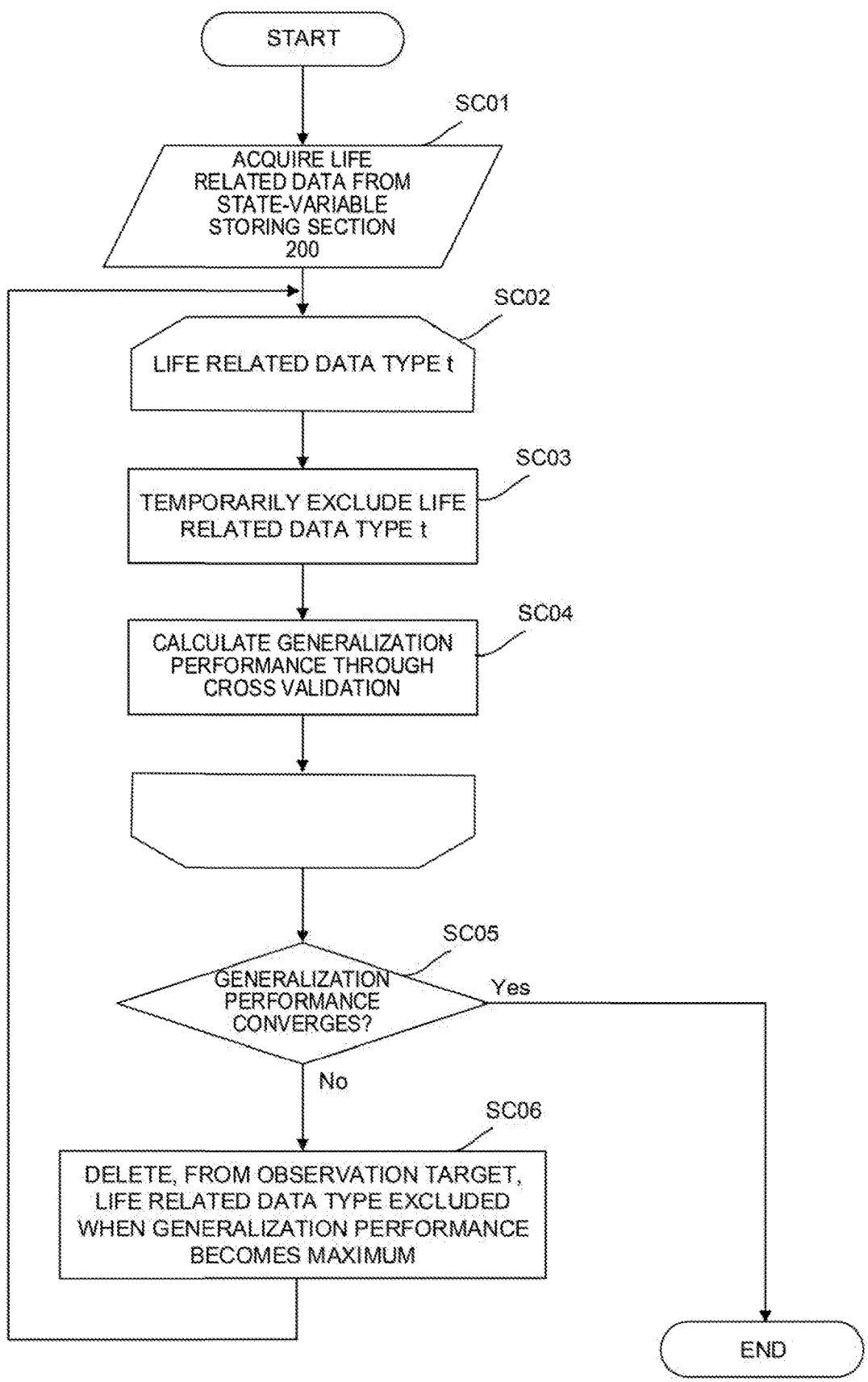
FIG. 10 is a schematic flowchart of processing executed by a feature reducing section in the life predicting device shown in FIG. 1.

FIG. 10 is a schematic flowchart of processing executed by the feature reducing section 152. The processing shown in the flowchart of FIG. 10 is executed at timing of an instruction from the operator or predetermined timing (e.g., at a time when pieces of life related data observed exceeds a predetermined number).

[Step SC01] The feature reducing section 152 acquires life related data from the state-variable storing section 200.

[Step SC02] The feature reducing section 152 repeatedly executes steps SC03 to SC04 for each type of the life related data.

[Step SC03] The feature reducing section 152 temporarily excludes a life related data type t from the life related data acquired in step SC01.

[Step SC04] The feature reducing section 152 instructs the cross validation section 154 to calculate, on the basis of the life related data from which the life related data type t is excluded in step SC04, generalization performance of a probability model created from the life related data through cross validation.

[Step SC05] The feature reducing section 152 determines whether a maximum value of the generalization performance calculated in steps SC02 to SC04 converges. When the maximum value converges, the feature reducing section 152 ends the processing. When the maximum value does not converge, the feature reducing section 152 shifts the processing to step SC06.

[Step SC06] The feature reducing section 152 deletes, from an observation target of the life related data, the life related data type t excluded when the maximum of the generalization performance calculated in steps SC02 to SC04 is calculated, gives a flag or the like indicating that the life related data type t is deleted from the state-variable storing section 200 or is not used, and shifts the processing to step SC02.

Figure 11:
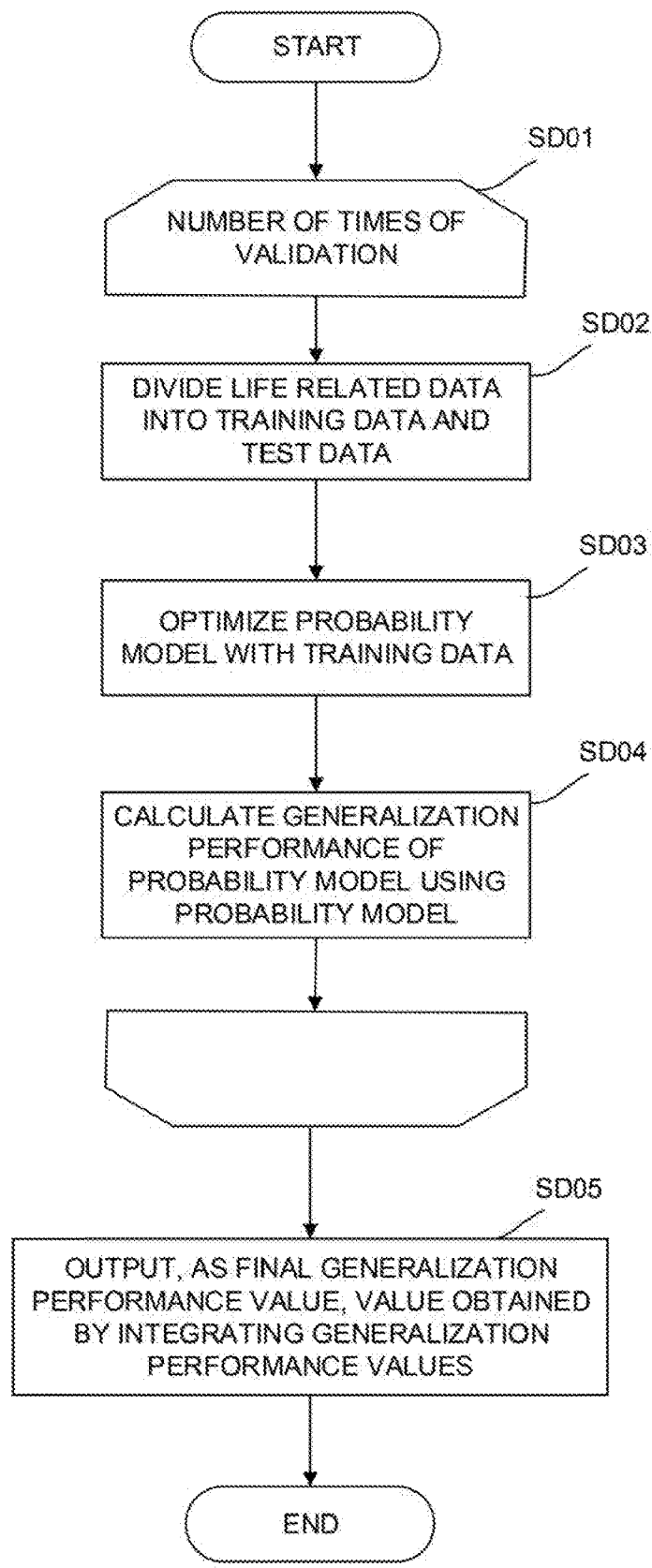
FIG. 11 is a schematic flowchart of processing executed by a cross validation section in the life predicting device shown in FIG. 1.

FIG. 11 is a schematic flowchart of processing executed by the cross validation section 154. The processing shown in the flowchart of FIG. 11 is executed according to an instruction from the feature reducing section 152.

[Step SD01] The cross validation section 154 repeatedly executes steps SD02 to SD04 by a predetermined number of times of validation.

[Step SD02] The cross validation section 154 divides life related data given from the feature reducing section 152 into training data and test data at random.

[Step SD03] The cross validation section 154 creates a probability model optimized on the basis of the training data.

[Step SD04] The cross validation section 154 calculates, using the probability model created in step SD03 and the test data, a value indicating generalization performance of the life related data given from the feature reducing section 152.

[Step SD05] The cross validation section 154 integrates calculated values of the generalization performance calculated in steps SD01 to SD04 by the number of times of validation and outputs an integrated value as a final generalization performance value.

The embodiment of the present invention is explained above. However, the present invention is not limited only to the example of the embodiment explained above and can be carried out in various forms by adding appropriate changes to the embodiment.

For example, the algorithms executed in the sections of the machine learning device 100 are not limited to the algorithms explained above and various algorithms can be adopted if the same object can be achieved.

The invention claimed is:

1. A life predicting device implemented as a machine controller that controls a manufacturing machine and predicts a service life for replacement of a consumable component of the manufacturing machine, the life predicting device comprising:
a machine controller processor that controls a motor or an actuator of the manufacturing machine to machine a workpiece; and
a machine learning device that trains and executes a machine learning algorithm to learn the service life for replacement of the consumable component, the machine learning device including a processor configured to:
a) observe while the motor or the actuator of the manufacturing machine is being operated by the machine controller processor during training and execution of the machine learning algorithm, as a state variable, life related data set as an observation target among life related data related to a life of the consumable component, life related data related to features that affect the life of the consumable component including features of operational parameters of the manufacturing machine that affect the wear of the consumable component;
b) store the life related data observed as the state variable;
c) train the machine learning algorithm through cross validation by:
i) splitting the life related data related to the features of the operational parameters of the manufacturing machine into two groups, a first group of the two groups being training data and a second group of the two groups being test data,
ii) creating a probability model of the service life for replacement of the consumable component based on the training data, the probability model having statistical parameters set on the basis of the life related data related to the features of the operational parameters of the manufacturing machine observed as the state variable,
iii) determining generalization performance based on a first subset of the test data within a predetermined distance of the probability model, and a second subset of the test data outside the predetermined distance of the probability model,
iv) creating a reduced set of life related data, by excluding the second subset of the test data from the life related data, the second subset including a type of the life related data having a low relation with the life of the consumable component among the life related data stored, and
v) repeating steps (i)-(iv) until the determined generalization performance converges; and
d) after step (c) is complete, execute the trained machine learning algorithm by predicting, using the created probability model, the service life for replacement of the consumable component, and determining that replacement of the consumable component should be performed based on the reduced set of life related data related to the features of the operational parameters of the manufacturing machine observed as the state variable,
wherein the consumable component is replaced based on the determination that replacement of the consumable component should be performed.

2. The life predicting device according to claim 1, wherein the processor is further configured to update and optimize parameters of the probability model on the basis of the life related data observed as the state variable.

3. The life predicting device according to claim 1, wherein the processor is further configured to create, on the basis of the life related data observed as the state variable, a cumulative probability distribution of the service life for replacement obtained by accumulating replacement probability density of the consumable component on the basis of the probability model and predict the service life for replacement of the consumable component using the created cumulative probability distribution.

4. A machine learning device integrated in a machine controller, the machine controller including a processor that controls a motor or an actuator of the manufacturing machine to machine a workpiece, the machine learning device learns a service life for replacement of a consumable component of the manufacturing machine based on observations during the operation of the motor or the actuator by the machine controller, the machine learning device comprising:
   a processor configured to:
   a) observe while the motor or the actuator of the manufacturing machine is being operated by the machine controller processor, as a state variable, life related data set as an observation target among life related data related to a life of the consumable component, the life related data related to features that affect the life of the consumable component including features of operational parameters of the manufacturing machine that affect the wear of the consumable component;
   b) store the life related data observed as the state variable;
   c) train the machine learning algorithm through cross validation by:
      i) splitting the life related data related to the features of the operational parameters of the manufacturing machine into two groups, a first group of the two groups being training data and a second group of the two groups being test data,
      ii) creating a probability model of the service life for replacement of the consumable component based on the training data, the probability model having statistical parameters set on the basis of the life related data related to the features of the operational parameters of the manufacturing machine observed as the state variable,
      iii) determining generalization performance based on a first subset of the test data within a predetermined distance of the probability model, and a second subset of the test data outside the predetermined distance of the probability model,
      iv) creating a reduced set of life related data, by excluding the second subset of the test data from the life related data, the second subset including a type of the life related data having a low relation with the life of the consumable component among the life related data stored, and
      v) repeating steps (i)-(iv) until the determined generalization performance converges; and
   d) after step (c) is complete, execute the trained machine learning algorithm by predicting, using the created probability model, the service life for replacement of the consumable component, and determining that replacement of the consumable component should be performed based on the reduced set of life related data related to the features of the operational parameters of the manufacturing machine observed as the state variable,
   wherein the consumable component is replaced based on the determination that replacement of the consumable component should be performed.

5. The machine learning device according to claim 4, wherein the processor is further configured to update and optimize parameters of the probability model on the basis of the life related data observed as the state variable.

6. The machine learning device according to claim 4, wherein the processor is further configured to create, on the basis of the life related data observed as the state variable, a cumulative probability distribution of the service life for replacement obtained by accumulating replacement probability density of the consumable component on the basis of the probability model and predict the service life for replacement of the consumable component using the created cumulative probability distribution.

7. The machine learning device according to claim 4, wherein the processor is further configured to:
   select life related data as an observation target;
   calculate, through cross validation, generalization performance of the probability model of the service life for replacement of the consumable component created on the basis of the life related data; and
   specify, on the basis of the generalization performance of the probability model, a type of life related data having a low relation with a life of the consumable component among the life related data stored and reduce, from the life related data as the observation target, the specified type of the life related data having the low relation with the life of the consumable component.

* * * * *